US011244541B2

(12) United States Patent
Kim

(10) Patent No.: US 11,244,541 B2
(45) Date of Patent: Feb. 8, 2022

(54) ONLINE CRANE GAME APPARATUS AND CRANE GAME SYSTEM

(71) Applicant: Hyun Ki Kim, Changwon-si (KR)

(72) Inventor: Hyun Ki Kim, Changwon-si (KR)

( * ) Notice: Subject to any disclaimer, the term of this patent is extended or adjusted under 35 U.S.C. 154(b) by 7 days.

(21) Appl. No.: 16/894,409

(22) Filed: Jun. 5, 2020

(65) Prior Publication Data

US 2020/0302753 A1 Sep. 24, 2020

Related U.S. Application Data

(63) Continuation of application No. PCT/KR2018/014120, filed on Nov. 16, 2018.

(30) Foreign Application Priority Data

Nov. 12, 2018 (KR) ........................ 10-2018-0137795

(51) Int. Cl.

| | |
|---|---|
| ***A63F 9/24*** | (2006.01) |
| ***A63F 13/00*** | (2014.01) |
| ***G07F 17/00*** | (2006.01) |
| ***G07F 17/32*** | (2006.01) |
| ***A63F 9/30*** | (2006.01) |

(52) U.S. Cl.

CPC ............ *G07F 17/3297* (2013.01); *A63F 9/30* (2013.01); *G07F 17/3209* (2013.01); *G07F 17/3213* (2013.01); *G07F 17/3253* (2013.01)

(58) Field of Classification Search

CPC ...... A63F 13/30; A63F 13/45; G07F 17/3297; G07F 17/3202

See application file for complete search history.

(56) References Cited

U.S. PATENT DOCUMENTS

| | | | | |
|---|---|---|---|---|
| 7,112,132 | B2 * | 9/2006 | Yamagishi .............. | G07F 17/32 463/1 |
| 9,818,265 | B1 * | 11/2017 | Shoemaker, Jr. ... | G07F 17/3248 |
| 10,249,148 | B2 * | 4/2019 | Chu .................... | G07F 17/3223 |
| 10,839,651 | B2 * | 11/2020 | Smart ................. | G07F 17/3209 |
| 10,974,140 | B1 * | 4/2021 | Verfaillie ................ | A63F 13/35 |

(Continued)

FOREIGN PATENT DOCUMENTS

| | | | |
|---|---|---|---|
| JP | 2013-208219 | A | 10/2013 |
| KR | 10-2011-0014946 | A | 2/2011 |
| KR | 101722634 | B1 | 4/2017 |

OTHER PUBLICATIONS

International Search Report issued in PCT/KR2018/014120; dated Aug. 5, 2019.

*Primary Examiner* — Milap Shah
*Assistant Examiner* — Jason Pinheiro
(74) *Attorney, Agent, or Firm* — Studebaker & Brackett PC

(57) ABSTRACT

Disclosed is an online crane game apparatus. The crane game apparatus includes: a body accommodated therein with prizes; a camera for photographing an inside of the body to generate a game play image; a screen unit provided on at least one surface of the body and having a single color; a communication unit for synthesizing a background video or image to an area corresponding to the screen unit in the game play image to transmit the synthesized background video or image to an outside; and a control unit for controlling the communication unit. Accordingly, the user plays the game while watching the game play image that is more exciting, so that a dynamic and realistic game is implemented.

7 Claims, 8 Drawing Sheets

(56) References Cited

U.S. PATENT DOCUMENTS

| | | | | |
|---|---|---|---|---|
| 2004/0002375 | A1* | 1/2004 | Ogawa | G07F 17/32 463/20 |
| 2009/0191931 | A1* | 7/2009 | Peck | G07F 17/32 463/7 |

* cited by examiner

ONLINE CRANE GAME APPARATUS AND CRANE GAME SYSTEM

CROSS-REFERENCE TO RELATED APPLICATIONS

The present application is a continuation of International Patent Application No. PCT/KR2018/014120 filed on Nov. 16, 2018, which is based upon and claims the benefit of priority to Korean Patent Application No. 10-2018-0137795 filed on Nov. 12, 2018. The disclosures of the above-listed applications are hereby incorporated by reference herein in their entirety.

BACKGROUND

1. Field of the Invention

The present invention relates to an online crane game apparatus, and more particularly, to an online crane game apparatus for synthesizing a background video or image with a game playing image so that a user plays a game more excitingly.

2. Description of the Related Art

A claw machine game of operating a crane to take a prize has been very popular. The claw machine game refers to a game in which various prizes are placed in a housing so that a user may operate a crane through a joystick or a button to take out and carry a prize.

In general, the crane game apparatus increases a fun of a game play by playing music that exerts a stress on the game play or congratulates an acquisition of the prize.

Since a conventional online crane game apparatus only provides a photographed image through online and has the same background, a provided game screen becomes monotonous even when the game is played like other online games.

Further, the game becomes tedious because the difficulty is controlled only by a shape and weight of the prize, and there is no further interruption effect.

Recently, there are increasing demands for new ways to enjoy various fun despite a simple crane game.

SUMMARY

In order to solve the above-described conventional problems, the present invention provides a crane game apparatus in which a background video or image synthesized with a game play image is provided through one side of the crane game apparatus photographed by a camera so that a user plays a crane game more excitingly.

In order to solve the above-described problems, one embodiment of the present invention provides an online crane game apparatus including: a body accommodated therein with prizes; a camera for photographing an inside of the body to generate a game play image; a screen unit provided on at least one surface of the body and having a single color; a communication unit for synthesizing a background video or image to an area corresponding to the screen unit in the game play image to transmit the synthesized background video or image to an outside; and a control unit for controlling the communication unit. Accordingly, the user who plays the game can enjoy a dynamic and realistic game according to the background video or image.

The control unit may synthesize the game play image with a background video or image corresponding to a game grade and a game progress of the user who plays the crane game, and transmit the synthesized image.

The background video or image may be received from the outside.

The prize may include a coupon exchangeable for a product related to the background video or image.

The synthesized background video or image may be provided with an image or usage information related to the prize when the prize is acquired.

To solve the above-described problems, one embodiment of the present invention provides an online crane game system, wherein each crane game apparatus includes: a body accommodated therein with prizes; a camera for photographing an inside of the body to generate a game play image; and a screen unit provided on at least one surface of the body and having a single color, in which the game play image may be synthesized with a background video or image from a server in an area corresponding to the screen unit. In regards to the game apparatus, a user terminal may access the game apparatus through the server, the game play image may be transmitted to the server or user terminal, the user may operate the game apparatus while watching the game play image received through the user terminal, and the user terminal may receive the game play image synthesized with the background video or image. Provided is/are According to the present invention, the user may watch the prize-related image synthesized with the game play image while playing the game, so that the satisfaction on the crane game apparatus of a manager and the user can be increased.

In addition, a dynamic and realistic game can be implemented through the game play image synthesized with an image increasing the tension of the game, while the user plays the game.

In addition, another user watching the game may select an image to be synthesized and may not feel bored during standby until playing the game, so that the satisfaction on the game can be increased.

DETAILED DESCRIPTION

Figure 1:
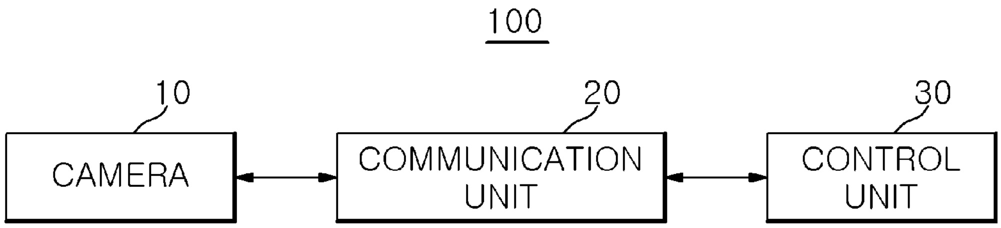
FIG. 1 shows a block diagram of an online crane game apparatus according to one embodiment of the present invention.

Hereinafter, exemplary embodiments of the present invention will be described in detail with reference to the accompanying drawings. Advantages and features of the present invention and methods of accomplishing the same will be understood more readily with reference to the following detailed description of embodiments taken in conjunction with the accompanying drawings. However, the present invention may be embodied in various other forms, and should not be construed as being limited to the embodiments set forth herein. The embodiments are provided so that the disclosure of the present invention will be thorough and complete, and will fully convey the scope of the invention to those of ordinary skill in the art to which the present invention pertains. The present invention will only be defined by the scope of the appended claims. Like reference numerals refer to like elements throughout the specification.

Unless defined otherwise, all terms (including technical terms and scientific terms) used herein have the same meaning as how they are generally understood by those skilled in the art to which the present invention pertains. In addition, unless expressly and explicitly defined otherwise, any term that is defined in a general dictionary shall not be interpreted to have an idealistic or excessive meaning. The terms used herein are intended to describe certain embodiments only, and shall by no means limit the present invention. In the present specification, unless the context explicitly dictates otherwise, expressions in a singular form include a meaning of a plural form.

FIG. 1 shows a block diagram of an online crane game apparatus according to one embodiment of the present invention.

Referring to FIG. 1, an online crane game apparatus 100 according to one embodiment of the present invention includes a camera unit 10, a communication unit 20 and a control unit 30.

The camera unit 10 photographs an inside of the crane game apparatus 100 through at least one camera (see 102 in FIG. 2) provided toward the inside of the crane game apparatus 100. The camera unit 10 generates a game play image based on the image photographed by the camera 102. The generated image is provided to an outside through the communication unit 20. The game play image may indicate a crane (see 104 in FIG. 2), prizes (see 106 in FIG. 2), a score place (see 103 in FIG. 2), a screen unit (see 105 in FIG. 2), and the like.

The camera 102 is configured to be moved based on a control signal received from a user. The camera 102 may be moved up, down, left, and right. To this end, the camera unit 10 may further include a camera moving unit for moving the camera 102.

The camera unit 10 may further include an image processing unit for processing the image obtained through the camera 102. The image processing unit may include an optical module including a lens, and a charged coupled device (CCD) that detects incident light and converts a subject image formed on a lens into an image as an electrical signal. Further, the image processing unit may be configured to generate a synthesized game play image formed by synthesizing a background video or image with a game play image.

The camera unit 10 generates the game play image while photographing the inside of the crane game apparatus 100. The crane game apparatus 100 receives a background video or image transmitted from the outside. The background video or image may be stored in a storage unit or the like provided inside the crane game apparatus 100. The camera unit 10 may synthesize the background video or image with an area corresponding to a background screen having a single color in the game play image photographed through the camera 102. The background screen constitutes the screen unit 105 of the crane game apparatus 100. The game play image synthesized with the background video or image is transmitted to the outside through the communication unit 20.

The communication unit 20 communicates with the outside of the crane game apparatus 100. The communication unit 20 allows the crane game apparatus 100 to communicate with external devices and to transmit and receive data. Types of data transmitted and received are various, such as voice, image, text, and video, and are not limited to the above-described examples.

The background video or image received from the outside of the crane game apparatus 100 will be described later. The synthesized background video or image serves as a background for the synthesized game play image. Specifically, a chroma-key technique is used as a scheme for synthesizing the background video and image with the game play image.

The chroma-key technique refers to a scheme of synthesizing a subject image, which is obtained by placing and photographing a person or object in front of a solid background, with another image. In other words, the chroma-key technique is a technique of forming one image by synthesizing a single-colored background of one image, which is photographed in the single-colored background, with another image.

The communication unit 20 may include a connection portion for wired communication to communicate with the external devices of the crane game apparatus 100. The connection portion may transmit/receive signals/data according to standards such as high definition multimedia interface (HDMI), consumer electronics control (HDMI-CEC), USB, and component, and include at least one connector or terminal corresponding to each of the standards. The crane game apparatus may perform wired communication with a plurality of servers through a wired local area network (LAN).

Types of communication supported by the communication unit 20 are not limited to the wired communication. The communication unit may include a radio frequency (RF) circuit for transmitting and receiving RF signals to perform wireless communication, and may be configured to perform at least one communication among Wi-Fi, Bluetooth, Zigbee, ultra-wide band (UWM), Wireless USB, and near field communication (NFC).

The control unit 30 performs a control to operate entire components of the crane game apparatus 100 according to one embodiment of the present invention. The control unit 30 may include a control program configured to perform the control operation, a non-volatile memory installed therein with the control program, a volatile memory on which at least a part of the installed control program is loaded, and at least one microprocessor or central processing unit (CPU) for executing the loaded control program. The control program may include a program (programs) implemented in at least one type of BIOS, device driver, operating system, firmware, platform, and application program (application). As one embodiment, the application program may be installed or stored in the crane game apparatus 100 in advance when the crane game apparatus 100 is manufactured, or may be installed in the crane game apparatus based on data of the application program received from the outside in later use. The data of the application program, for example, may be downloaded to the crane game apparatus 100 from an external server such as an application market.

The crane game apparatus 100 may further include a storage unit for storing data or the like. The storage unit may store various information such as user history-related information, game play information, and game apparatus operation-related parameters. Further, the storage unit may store background videos or images received from the outside.

The background video or image has been described as being synthesized with the game play image in the image processing unit of the crane game apparatus 100, but the present invention is not limited thereto. The online crane game system may include a crane game apparatus 100, a user terminal for controlling the crane game apparatus 100, and a server for intermediating between the crane game apparatus 100 and the user terminal. As described above, the crane game apparatus 100 may synthesize the background video or image with the game play image and provide the synthesized video or image to the server. The crane game apparatus 100 may simply provide the game play image photographed by the camera 102 to the server. In this case, the server may synthesize the background video or image with the game play image received from the crane game apparatus 100 and provide the synthesized background video or image to the user terminal. The background video or image may be provided by using data stored therein or may be provided by the user terminal. As a further embodiment, the server may also transmit the game play image to the user terminal without synthesizing the game play image, and the user terminal may synthesize the background video or image and display the synthesized background video or image on a display unit. In this case, the background video or image may be provided by using data stored therein or may be provided from the outside, especially from the server.

Figure 2:
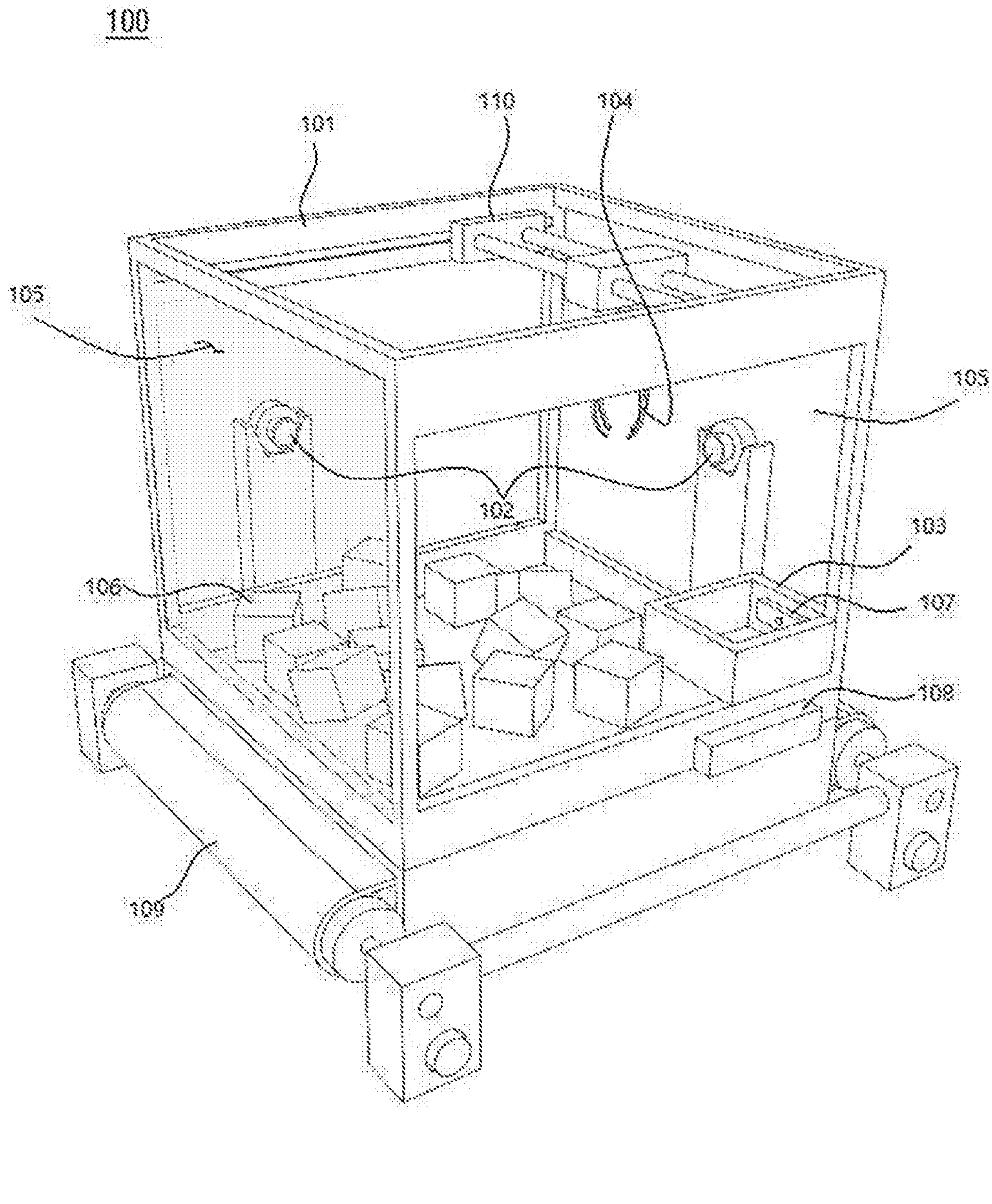
FIG. 2 shows the online crane game apparatus according to one embodiment of the present invention.

FIG. 2 shows the online crane game apparatus according to one embodiment of the present invention.

Referring to FIG. 2, an online crane game apparatus 100 according to one embodiment of the present invention includes a body 101, at least one camera 102, a score place 103, a crane 104, and a screen unit 105.

The body 101 accommodates components of the crane game apparatus 100. A prize 106 is accommodated inside the body 101. A plurality of prizes 106 may be provided and each of the prizes 106 may have a different shape, weight, or size. The body 101 may be configured to have a cuboid shape as shown in FIG. 2, but it is not limited thereto.

The body 101 may include a prize rotation unit 109 at the bottom of the body. A position of the prize 106 may be changed through the prize rotation unit 109. The prize rotation unit 109 may be operated before the crane game starts, or may be operated by the user who plays the game or the standby users who watch the game. In addition, the prize rotation unit 109 may be configured to be operated periodically when a predetermined period of time passes since the game is played, or may be operated after detecting the prizes 106 crowded in one place. The control unit 30 may analyze the game play image and determine that the prizes 106 are crowded in one place.

In addition, the crane game apparatus 100 may be provided therein with a sensor for detecting whether the prizes 106 are stacked at a predetermined height or more. When the prizes 106 are stacked at the predetermined height or more, the control unit 30 may control the prize rotation unit 109 to scatter the prizes 106.

In addition, the crane game apparatus 100 may be additionally provided with a sensor capable of sensing whether the prizes 106 are blocking the score place 103. When the prizes 106 block the score place 103, the control unit 30 may control the prize rotation unit 109 to scatter the prizes 106. When the state of blocking the score place 103 is not solved despite the scattering control, the control unit 30 may temporarily stop the game play and control the crane 104 to attempt to change positions of the blocking prizes 106. When the blocking is not solved by the above attempt, the control unit 30 may inform a supplier's terminal of the above situation through the communication unit 20.

The screen unit 105 is provided in a single color on at least one surface of the body 101. A surface of the body 101 other than the screen unit 105 is partially formed of a transparent material such that the inside is viewed from the outside. In addition, the screen unit 105 may be provided such that one surface of the body 101 is green as shown in FIG. 2. Unlike the drawing, the screen unit 105 may be formed to be opaque. The screen unit 105 is provided on a surface other than the surface on which the camera 102 is installed, among a plurality of surfaces of the body.

The game play image photographed by the camera 102 is synthesized with the background image in the screen unit 105 included in the game play image, through the control unit 108 provided in the crane game apparatus 100.

When the screen unit 105 is provided on a plurality of surfaces of the body, the game may be enjoyed more excitingly after the photographed game play image is synthesized with the background image.

The crane 104 is configured to be moved up, down, left, and right at an upper portion of the body 101. The crane 104 is moved based on a control signal for the crane 104 received from the server. After completion of the movement, the crane 104 is moved down from a position of the completed movement and grips the prize. After gripping the prize, the crane 104 rises up to the upper portion of the body and is moved to the score place 103. After completion of the movement, the crane 104 performs an action of releasing the prize. The action of the crane 104 is conducted regardless of actual grip with respect to the prize, and the prize is treated as being acquired when the prize 106 falls to the score place 103. The method of playing the game through the server will be described later.

In addition, the crane 104 is moved by the crane movement unit 110. The crane 104 is moved up, down, left, and right by the crane movement unit 110 according to control signals from the user.

The score place 103 ascends at a predetermined height from a bottom surface of the body 101 and is formed in a predetermined area. The camera 102 may be provided to enlarge the score place 103.

The crane game apparatus according to one embodiment of the present invention may include a sensor unit 107. The sensor unit 107 detects that the prize 106 reaches or passes the score place 103. In addition, the sensor unit 107 detects the prize 106 acquired by the user, and notifies the controller 108 so as to provide a prize information video or image for prize guidance to the user.

In addition, when the prize 106 is present at the bottom of the score place 107 based on the image photographed by the camera 102, it may be determined that the prize 106 has passed the score place 103. When the prize 106 passes the score place 103, the control unit 103 may operate the prize rotation unit 109.

Figure 3:
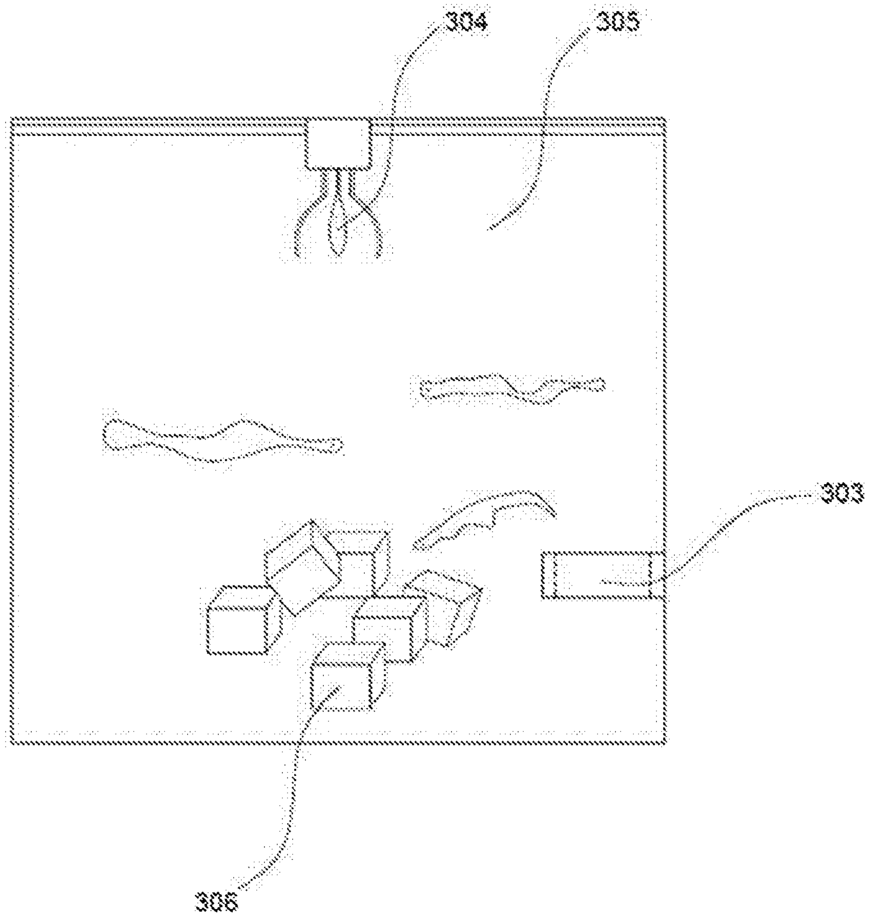
FIG. 3 shows a game play image of the online crane game according to one embodiment of the present invention.

FIG. 3 shows a game play image of the online crane game according to one embodiment of the present invention.

Referring to FIG. 3, the online crane game play image according to one embodiment of the present invention may include a score place 303, a crane 304, a screen unit 305, and prizes 306.

The game play image photographed by the camera may be displayed in 2D or 3D. An image photographed by a plurality of cameras may be used to provide the image in 3D. As described above, the game play image may be provided after being synthesized with the background video or image 305. The background video or image 305 is synthesized instead of an area corresponding to the screen unit 105 in the game play image.

As shown in FIG. 3, the background video or image 305 may include an interruption image in which earthworms interrupt pathways on which the crane is moved to the prizes. In addition, the background video or image may include information on the prize accommodated inside the body. In addition, the background video or image may include a guide image for facilitating the game play with regard to a simple background or the game play. For example, the guide image may be separately purchased by the user, and the cost for the guide image may arise according to a type or position of the prize.

Figure 4:
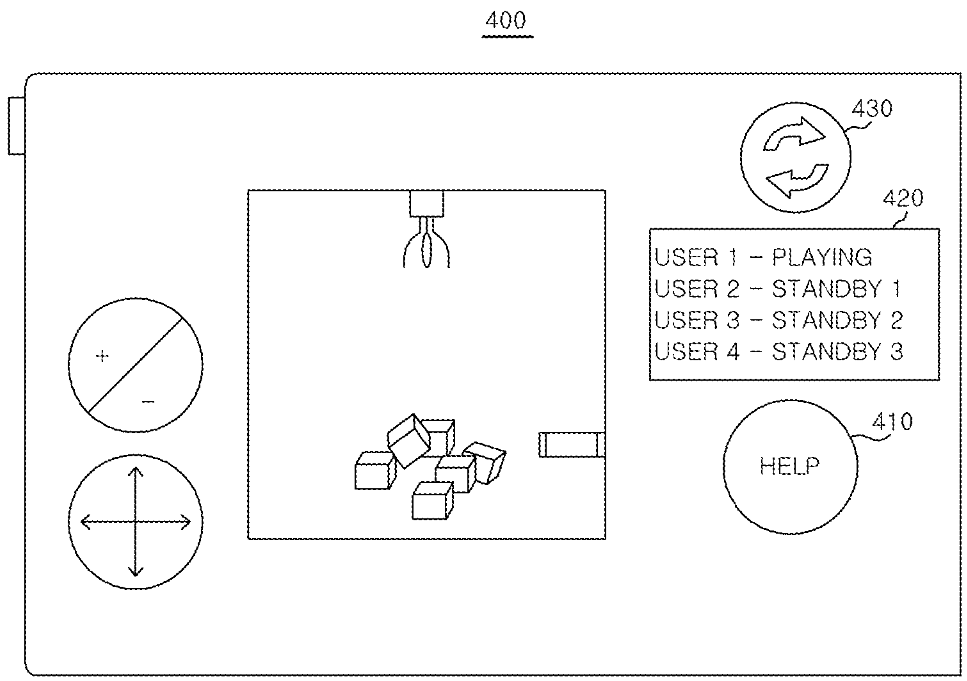
FIG. 4 shows an example of a user terminal that operates the online crane game apparatus according to one embodiment of the present invention.

FIG. 4 shows an example of a user terminal 400 that operates the online crane game apparatus according to one embodiment of the present invention.

Referring to FIG. 4, a screen of the user terminal 400 operating the crane game apparatus is shown. For example, the user terminal 400 may be implemented as a smartphone provided in a front thereof with a touch panel.

The user terminal 400 displays a game play image photographed from the camera. The user terminal 400 may provide various user interfaces (hereinafter referred to as 'UI'). The UI may include a help request icon 410, a waiting list 420, and a viewpoint switching icon 430.

The help request icon 410 refers to a UI for allowing the user to watch the guide image by selection. The user who plays the game may touch the help request icon 410 to properly select the guide image and receive an assist for the game play. When the help request icon 410 is touched, a predetermined cost may be paid. The guide image may be transmitted from at least one of the crane game apparatus 100, the control unit 30, and the server (see 900 in FIG. 11).

The waiting list 420 includes a list of the user who plays the game apparatus and users who access the game apparatus.

The viewpoint switching icon 430 refers to a UI touched when the user wants to watch the game play image from a different viewpoint. When a plurality of cameras 102 are provided in the crane game apparatus 100, and the user touches a corresponding button based on the game play image received through any one camera 102 while playing the game, a game play image received through another camera 102 may be watched.

Further, the UI may further include a viewpoint movement icon, which refers to a UI for moving the camera 102 being photographing the game play image. The camera may be moved up, down, left, and right through the viewpoint movement icon so that the user may be provided with the game play image photographed at a position more convenient to play the game.

Figure 5:
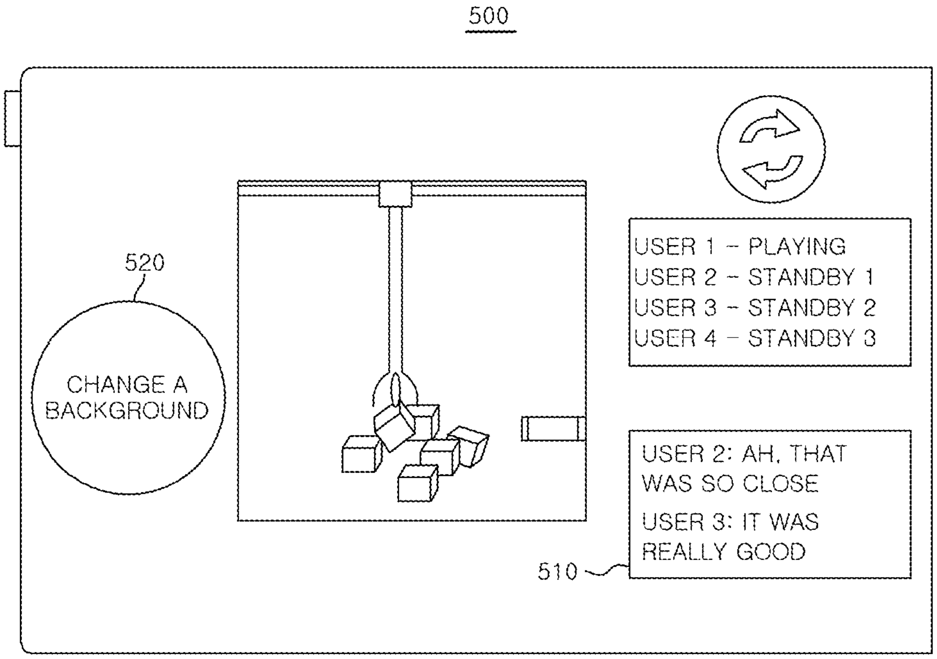
FIG. 5 shows an example of a user terminal through which a game play according to one embodiment of the present invention is watched.

FIG. 5 shows an example of a user terminal through which a game play according to one embodiment of the present invention is watched.

Referring to FIG. 5, a screen of a user terminal 500 watching the play of the crane game is shown.

The watching user terminal 500 may indicate various UIs. The UI provided to the watching users may include a game play image being watched, a chat window 510 in which the users may chat while waiting for the game, and a background selection icon 520.

The users watching the crane game may select a background video or image to be synthesized in a background of the game play image and provided through the background selection icon 520, so that the game may be played more excitingly.

The background video or image to be provided includes an interruption image, a guide image, a prize information image, and a congratulation image. The selected background image is synthesized with the screen unit in the game play image photographed by the camera through at least one of the camera, the control unit, and the server, and provided to all users who are connected to the crane game apparatus. In addition, the background selection icon 520 includes a background image. The watching user may transmit a video or image stored in the user terminal 500 to the server such that the transmitted video or image is used as a background of the game in progress. The server may apply a predetermined waiting time to prevent the background from being changed for an excessively short period of time, and a predetermined amount of cost may be paid whenever the background is changed.

Figure 6:
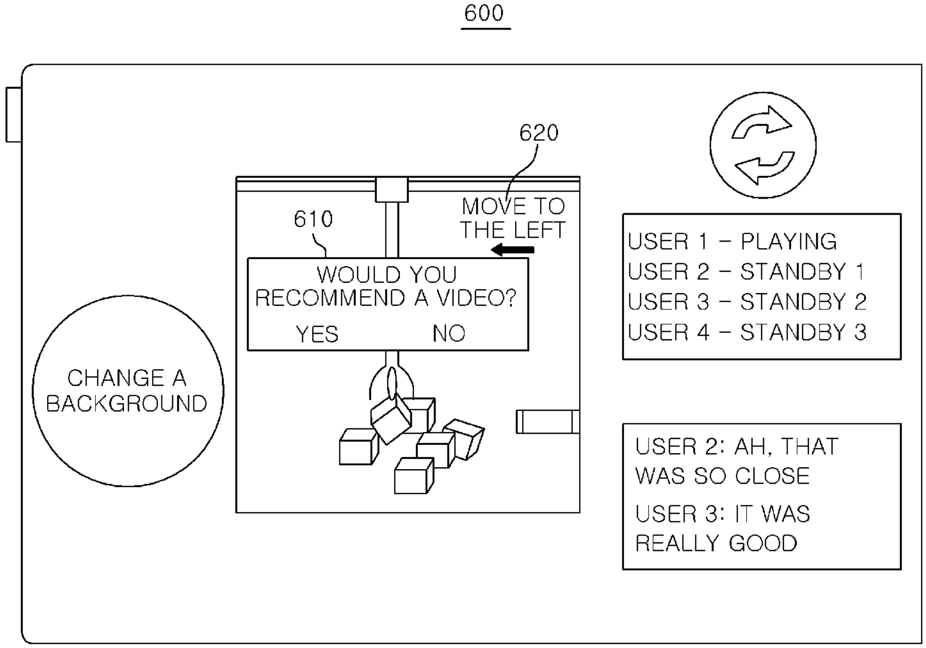
FIG. 6 shows an example for explaining the game play according to one embodiment of the present invention.

FIG. 6 shows a user terminal to describe the game play according to one embodiment of the present invention.

Referring to FIG. 6, the user playing or observing the crane game may provide feedback 610 on the background image to the crane game apparatus.

The crane game apparatus may provide a pop-up window 610 for receiving a recommendation of whether the background image displayed through a user terminal 600 is helpful to a user who watches the image, store the number of recommendations, and provide the number of recommendations for reference when the image is provided to another user. For example, in the case that the background image is a guide image 620, the pop-up window 610 may be displayed on the user terminal 600 when the crane reaches the prize. In addition, the pop-up window 610 may be displayed on the user terminal 600 even after the game is over.

Figure 7:
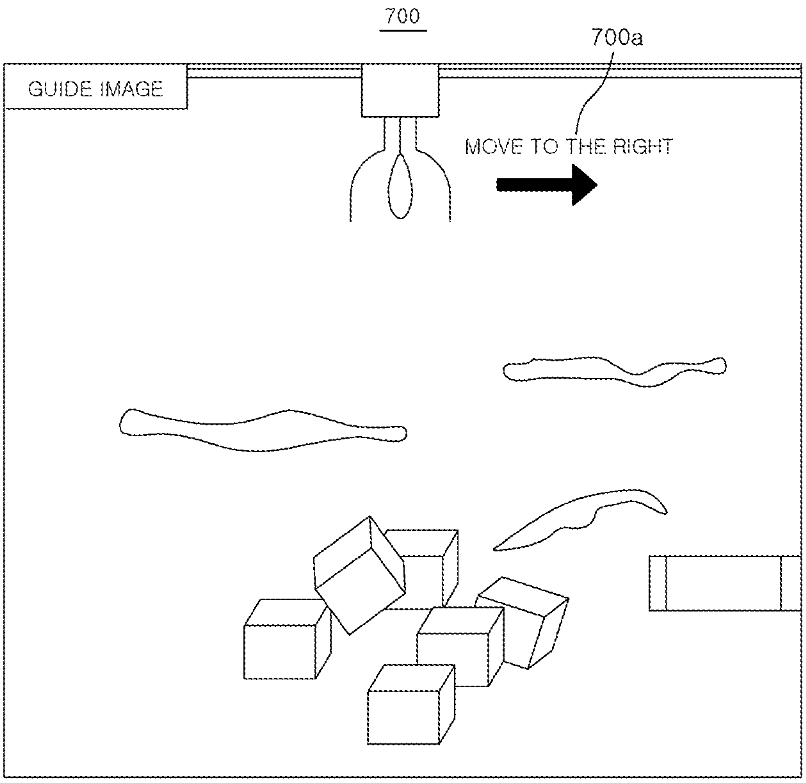
FIG. 7 shows examples of a guide image synthesized in the game play image according to one embodiment of the present invention.

FIG. 7 shows examples of a guide image including various images synthesized in the game play image according to one embodiment of the present invention.

The background images 700*a* to 700*d* displayed on a user terminal 700 vary according to the user, the type of prize, and the difficulty of game.

Figure 8:
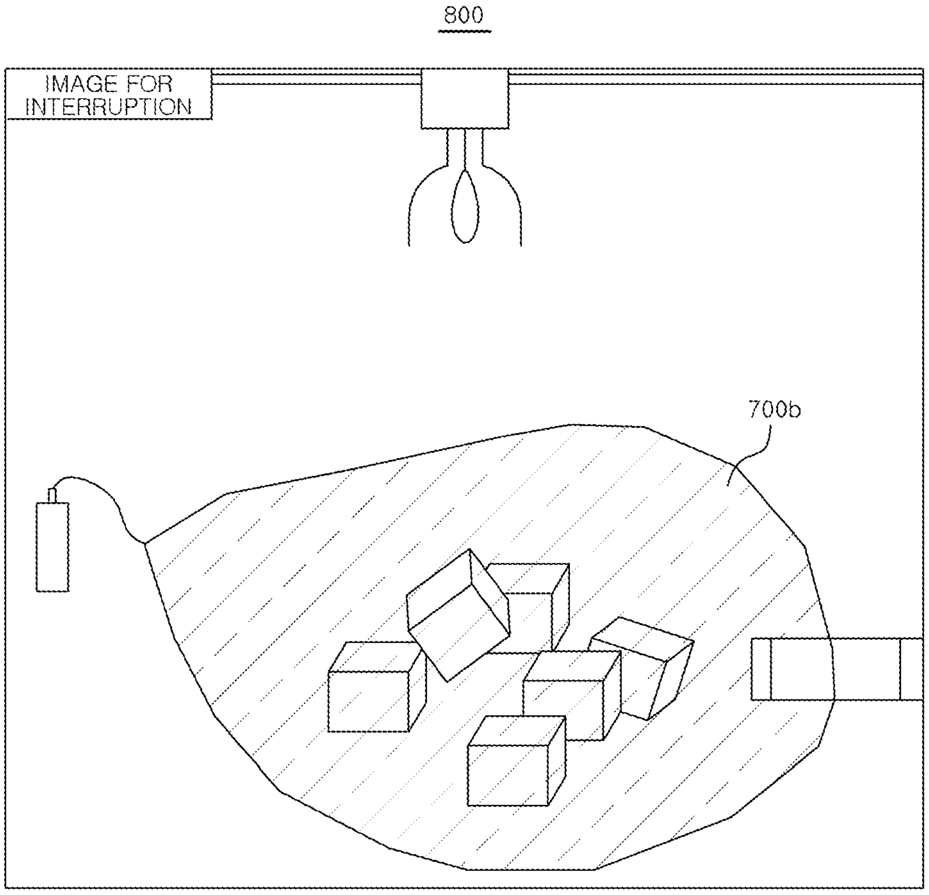
FIG. 8 shows examples of image for interruption synthesized in the game play image according to one embodiment of the present invention.

For example, the background image 700*a* includes a guide image. The guide image varies according to the prize accommodated in the body of the game apparatus. When the user selects one prize, a guide image corresponding to the selected prize may be provided. The guide image provides a guide such that the user enables the crane to move to the selected product according to a control signal. As shown in FIG. 8, the guide image may use an arrow and a comment such as "Move to the right" to guide the user to move the crane.

Figure 9:
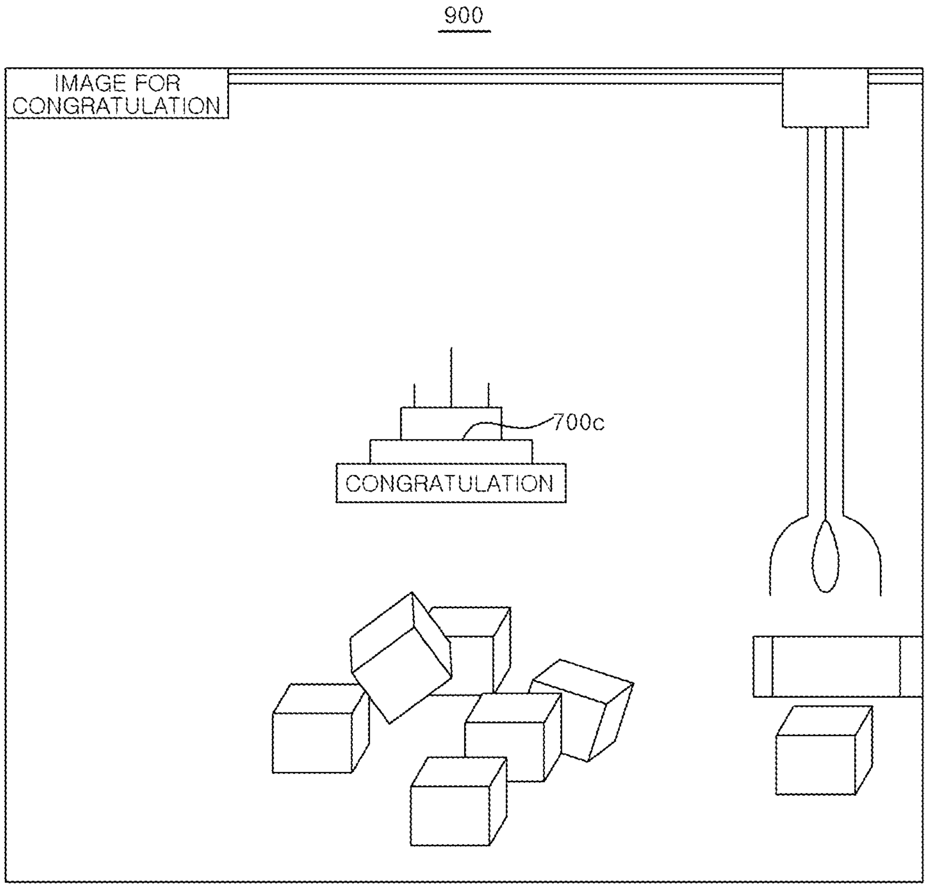
FIG. 9 shows examples of image for congratulation synthesized in the game play image according to one embodiment of the present invention.

As another example, the background image 700*b* includes an interruption image. The interruption image varies according to a score of the user stored in the server. When the score of the user is high, the interruption image may include an obstacle for making the user feel difficult to accurately determine a position of the prize accommodated inside the body of the crane game apparatus. For example, as shown in FIG. 9, when smoke is sprayed from a fire extinguisher and forms fog around the prizes inside the body, the user may feel difficult to determine positions of the prizes. In addition, the interruption image may be applied by other users watching the game.

In addition, the background image 700*c* may include a congratulation video or congratulation image when the user acquires the prize. For example, as shown in FIG. 9, the congratulatory video is provided when the prize passes the score place.

Figure 10:
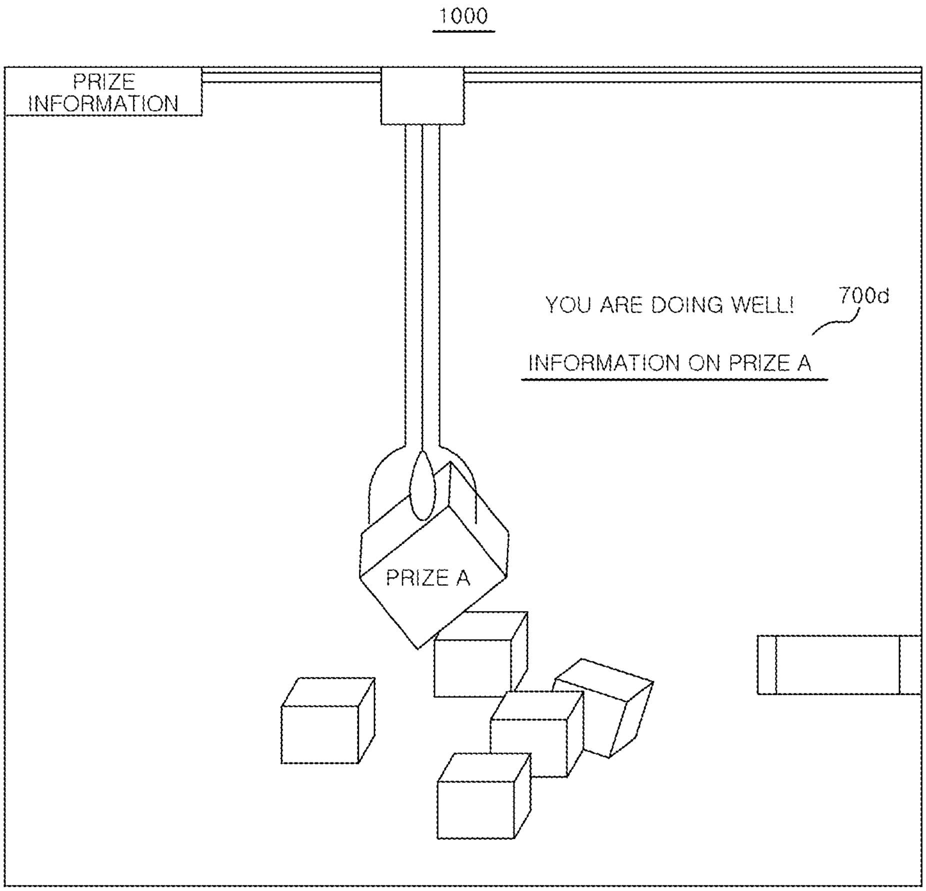
FIG. 10 shows examples of a prize information synthesized in the game play image according to one embodiment of the present invention.

In addition, the background image 700*d* may include a proper reaction in response to a user's game playing ability while the user plays the game. For example, as shown in FIG. 10, when the user picks up prize A by using the crane, a background video is provided to check information on prize A, together with a comment such as "You are doing well". The user may check the information on prize A as a background of the game play image by clicking the "information on prize A".

As a further embodiment, the background video or image may be differently provided depending on how much the crane game apparatus 100 was used and how many scores were recorded by the user. To this end, user identification information and user game play history information may be used. The information may be stored in the server or the crane game apparatus 100. When the user uses a specific crane game apparatus 100 a predetermined number of times or more, a message celebrating the number may be synthesized in the background image. Further, various information may be provided to the user as a background video or image by analyzing the game play information of the user. The provided information may include the number of successful prize score of the user, the direction in which a crane is biased by the user, and whether a grab button by the user is fast or late. To this end, the control unit 30 may analyze the game play image of the user in advance.

Figure 11:
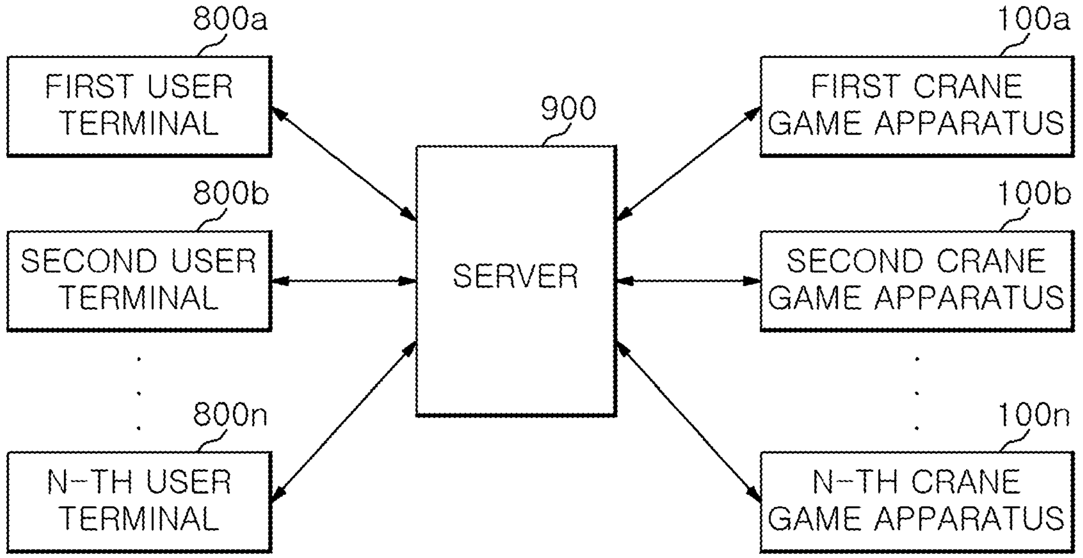
FIG. 11 shows a block diagram of an online crane game system according to an embodiment of the present invention.

FIG. 11 shows a block diagram of an online crane game system according to an embodiment of the present invention.

Hereinafter, components and operations of the online crane game system according to one embodiment of the present invention will be described in detail with reference to FIG. 11. For convenience of description, hereinafter, the online crane game system will be also referred to as a system.

Referring to FIG. 11, the system includes a plurality of user terminals 800*a* to 800*n*, a server 900, and a plurality of crane game apparatuses 100*a* to 100*n*. A plurality of users access the crane game apparatuses through the server by controlling the user terminals 800*a* to 800*n*, respectively. The user terminals 800*a* to 800*n*, the server 900, and the crane game apparatuses 100*a* to 100*n* are configured to transmit data to each other. Each of the user terminal and the server may include any one of a fixed display device, such as a desktop computer, a TV, or a digital signage, and a mobile display device, such as a laptop computer, a smartphone, a tablet PC, a portable terminal, or a wearable device.

The user terminal 800*a* to 800*n* receives a game play image of the crane game apparatus 100*a* to 100*n* from the server 900. The user terminal 800*a* to 800*n* provides the received game play image to the user who plays the game. Referring to FIGS. 4 to 6, the user terminal 800*a* to 800*n* includes a display unit and a touch panel for enabling the user to operate the user terminal 800*a* to 800*n* while watching the game play image. The user terminal 800*a* to 800*n* transmits a control signal for controlling the crane game apparatus to the server according to the operation by the user. The user terminal provides a game result received from the server to the user.

A plurality of users may access the crane game apparatus 100*a* to 100*n* through a plurality of user terminals 800*a* to 800*n* via the server 900, and the users other than the user who plays the game may watch the game through the user terminals 800*a* to 800*n*.

The server 900 mediates communication between the user terminals 800*a* to 800*n* and the crane game apparatuses 100*a* to 100*n*. The server 900 transmits the game play image received from the crane game apparatus 100*a* to 100*n* to the user terminal 800*a* to 800*n*, transmits the game play result received from the crane game apparatus 100*a* to 100*n* to the user terminal 800*a* to 800*n* as a game result, and stores the game result of the user in a database. The server 900 may provide other guide images to the user based on the stored game result of the user.

The server 900 includes a video or image related to a prize accommodated inside the crane game apparatus 100*a* to 100*n*. The server synthesizes the video or image related to the prize with the game play image and transmits the synthesized video or image to the user terminal 800*a* to 800*n*. The user may select and watch the background video or image related to the prize at a desired time such as upon the prize acquisition, before the game play, or during the game play. In addition, after the game is over, the server 900 provides the game result to the user and allows the user to select at least one of checking the prize, finishing the game, retying the game, and watching a game play of another user. When the user selects the checking of the prize, the user receives a prize-related video or image stored in the server 900.

In addition, the server 900 may receive the background video or image from the outside. The received background video or image may be synthesized with the game play image and transmitted to the user terminal 800*a* to 800*n*.

The video or image received from the outside may be the video or image related to the prize accommodated in the body.

The prize may include a coupon that is exchangeable for a product provided among videos or images stored in the server.

In addition, according to the system of the present invention, an image processing unit for synthesizing the game play image with the video or image stored in the server 900 may be provided in the server 900.

The image processing unit may synthesize the background video or image stored in the server with the game play image transmitted from the crane game apparatus 100*a* to 100*n* and transmit the synthesized background video or image to the user terminal 800*a* to 800*n*.

In addition, according to the system of the present invention, the image processing unit for synthesizing the game play image with the background video or image stored in the server 900 may be provided in the user terminal 800*a* to 800*n*.

The image processing unit provided in the user terminal 800*a* to 800*n* synthesizes the game play image transmitted from the server with the background video or image transmitted from the server 900 and provides the synthesized game play image to the user. Alternatively, the game play image may be provided to the user after synthesized with the background video or image transmitted from the server 900 and stored in the user terminal 800*a* to 800*n* in advance.

The background image synthesized with the game play image may correspond to a movement of the crane that moves inside the crane game apparatus. Concerning the synthesized image, an image photographed by the camera may be enlarged based on the game play, and the enlarged image may be synthesized with the game play image, so that a dramatic and exciting game may be provided to the user.

In addition, the background image may include an image for interrupting the game so as to raise the game difficulty. For example, the interrupting image may be synthesized with the game play image to make the user feel difficult to figure out a position of the crane or prize. When a user score stored in the database is high, the interrupting image may be synthesized with the game play image and provided to the user. Alternatively, for example, when the first user terminal 800*a* accesses the first crane game apparatus 100*a* and plays the crane game, users operating the user terminal 800*b* to 800*n* and observing the game play image may change a background of the game play image by selecting the interruption image. The interruption image may be configured such that the interruption image is synthesized with the game play image when the watching user pays the money so as to prevent the user playing the game from acquiring the prize.

In addition, the background image may include a guide image for helping users to facilitate the game play. The guide image may be provided from the server, and may be additionally paid and purchased by the user through the server 900.

It is most important for the user terminal to continuously receive the game play image so as to enjoy the game smoothly. To this end, the user terminal 800*a* to 800*n* and the server 900 may receive the game play image through an adaptive streaming mode. The adaptive streaming mode refers to a mode in which an electronic device recognizes network environments for itself and adaptively changes a resolution of an image to transmit and receive the image. The resolution of the game image provided to the user may vary depending on the network environments. For example, when a communication status of the server is poor, the game play image is transmitted after encoded low, and when the communication status is good, the game play image is transmitted after encoded high. The communication status may be determined by using a response speed between the server and the user terminal. The server and the user terminal may communicate with each other to check the communication status. The server may transmit a resolution signal for informing that a game play image having a low resolution is sent based on the communication status. When the resolution signal is received, the user terminal may decode the received game play image based on the received resolution signal, and may display the decoded image through the display unit.

The adaptive streaming mode may also be applied between the crane game apparatus and the server.

In addition, the system may further include an intermediary server that mediates data transmission, a synchronization server for data synchronization, and the like in addition to the user terminal, the server, and the crane game apparatus.

What is claimed is:

1. An online crane game apparatus for remotely playing a crane game, the online crane game apparatus comprising:

a body accommodated therein with prizes;

a score place configured to be positioned inside the body and vertically formed with an opening such that a prize released from a location above the opening passes through the opening and falls onto a bottom of the body;

a crane provided at an upper portion of the body to pick up the prize and move the prize to the score place;

a sensor unit installed at the score place to detect whether the prize passes through the score place;

a camera for photographing an inside of the body to generate a game play image;

a screen unit provided on at least one surface of the body and having a single-colored background configured to be used for synthesizing images by using a chroma-key technique;

a communication unit for communicating with an outside of the online crane game apparatus by applying an adaptive streaming mode; and a control unit configured to, based on a selection by the user, control the communication unit to synthesize, by using the chroma-key technique, an area corresponding to the screen unit in the game play image with any one of a background video or image, an interruption video, a guide video, a prize information image corresponding to the prize acquired by a user, and an image corresponding to a movement of the crane, and an image corresponding to a game grade and a game play status of the user, and transmit the synthesized image to the outside, wherein the controller is further configured to control the communication unit to synthesize the area corresponding to the screen unit in the game play image with at least one of the guide video and the interruption video, wherein the guide video corresponds to the prize selected by a user input and includes guide information to move the crane to the prize selected by the user input, and wherein the interruption video includes an obstacle image overlayed on a region corresponding to a location where the prizes are positioned.

2. The online crane game apparatus of claim 1, wherein the background video or image is received from the outside.

3. The online crane game apparatus of claim 1, wherein the prize includes a coupon exchangeable for a product related to the background video or image.

4. The online crane game apparatus of claim 1, wherein the guide video includes an arrow image and texts to guide movement of the crane.

5. The online crane game apparatus of claim 1, wherein the control unit is configured to control the communication unit to synthesize the area corresponding to the screen unit in the game play image with the interruption video when a user score is higher than a predetermined value.

6. The online crane game apparatus of claim 1, wherein the interruption video is a sprayed smoke image to form a fog around the prizes.

7. The online crane game apparatus of claim 1, wherein the control unit is configured to transmit the synthesized image to a user terminal including a screen configured to display the synthesized image.

* * * * *